May 3, 1966    L. W. FLECKENSTEIN ETAL    3,249,122
CONTROL VALVE FOR WATER SOFTENERS
Filed Aug. 16, 1963    5 Sheets-Sheet 1

INVENTORS
LAMBERT W. FLECKENSTEIN
ANDREW J. FLECKENSTEIN
BY
*Malcolm S. Bradway*
ATTORNEY INVENTORS
LAMBERT W. FLECKENSTEIN
ANDREW J. FLECKENSTEIN
BY
Malcolm S. Bradway
ATTORNEY

INVENTORS
LAMBERT W. FLECKENSTEIN
ANDREW J. FLECKENSTEIN
BY

ATTORNEY

May 3, 1966   L. W. FLECKENSTEIN ETAL   3,249,122
CONTROL VALVE FOR WATER SOFTENERS

Filed Aug. 16, 1963   5 Sheets-Sheet 4

INVENTORS
LAMBERT W. FLECKENSTEIN
ANDREW J. FLECKENSTEIN
BY
ATTORNEY

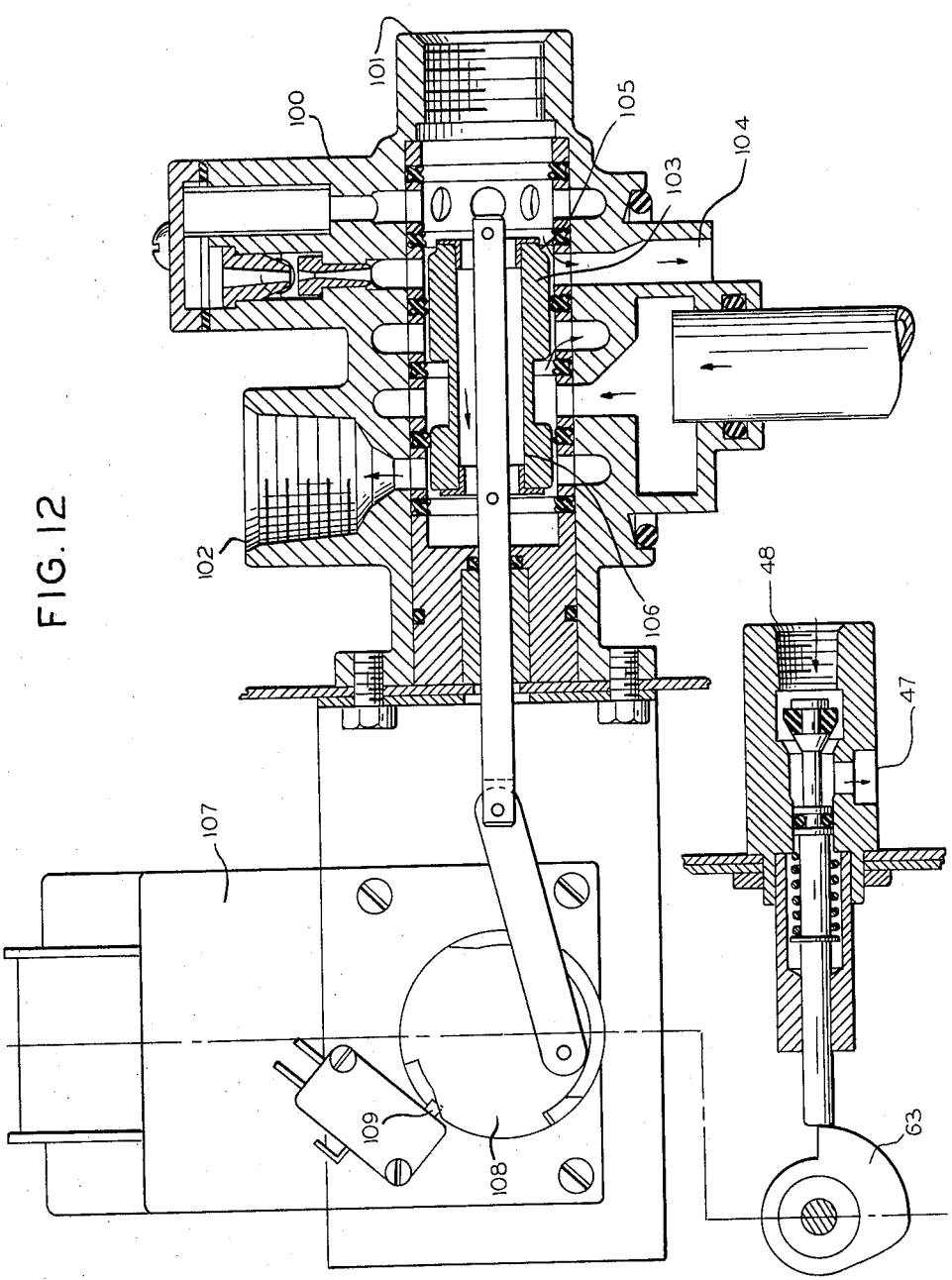

United States Patent Office 3,249,122
Patented May 3, 1966

3,249,122
CONTROL VALVE FOR WATER SOFTENERS
Lambert W. Fleckenstein, 4445 N. 135th, and Andrew J. Fleckenstein, 13650 Squirrel Drive, both of Brookfield, Wis.
Filed Aug. 16, 1963, Ser. No. 302,669
7 Claims. (Cl. 137—625.29)

This invention is directed to improvements in control valves which are particularly adaptable for use with water softening apparatus.

The major purposes of the present invention are to create new and simplified control valve facilities for water softening apparatus, through use of a novel motor operated, piston type valve, the overall arrangement of the valve being such that the valve assembly itself is relatively compact while enabling economies in the manufacturing process as well as presenting simplified plumbing for connection to a more or less conventional water softening system which includes a softener tank and a brine tank for regeneration purposes.

A related purpose of the invention is to create new and simplified means for arranging a piston type control valve with a plurality of inlet and outlet passages for control of flow through the valve.

Another related purpose of the present invention is the creation of improved facilities for slidably mounting a valve piston within a valve body of a multi port control valve, the facilities being such as to provide clearance between the piston and valve bore while at the same time providing good sealing contact between the valve bore and lands of the piston.

These and other purposes will appear from time to time in the course of the ensuing specification and claims, when taken with the accompanying drawings, in which:

FIGURE 12 is a sectional view of the valve with certain modifications to provide for rapid rinsing of a softener tank.

Figure 9:
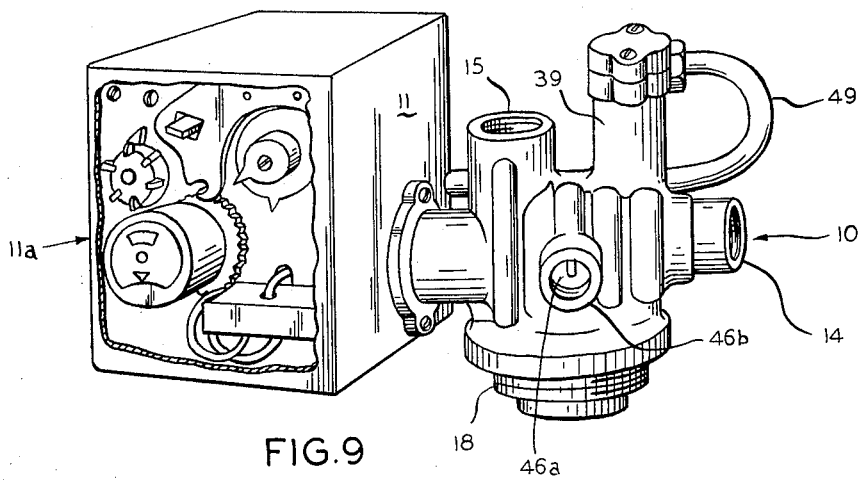
FIGURE 9 is a perspective view of one side of the valve when assembled with a control unit.
Figure 10:
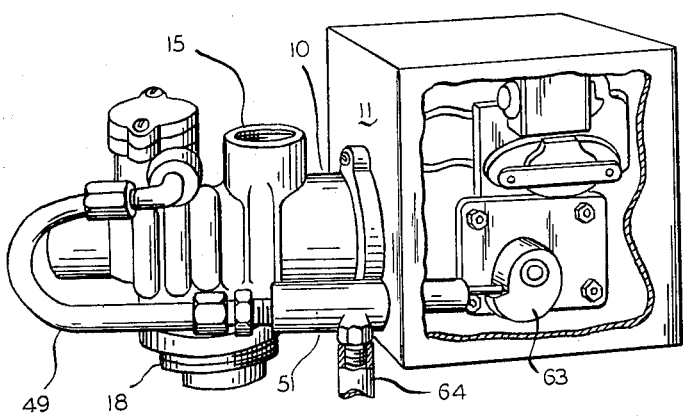
FIGURE 10 is a perspective view of the other side of the assembly of FIGURE 9.

Similar characters of reference indicate corresponding parts throughout the various views, and referring now to the same, the character 10 generally designates a valve body mounted on a support 11 by means of the bolts or screws 12. Support 11 may be one wall of a housing for a timer generally designated at 11a (FIGURES 9 and 10). Timer 11a controls the energization of a drive motor 13 for the movable valve controlling elements in body 10.

The body 10 of the valve assembly has a threaded inlet 14 at one end of a bore 14a and a threaded outlet 15 at the other end. Additional inlets and outlets 16 and 17 communicate with the bore between the ends thereof. The lower portion of body 10 is also arranged for threaded engagement at 18 with an enclosure 20 and sealed by the O ring or the like shown as 19.

A plug 21 closes that end of bore 14a which is opposite the inlet end 14. A piston 22 is mounted for sliding movement axially of bore 14a. Piston 22 is connected by means of the cylindrical members 23 at each of its ends and held by the pins 24 to a piston rod 25. Piston rod 25 extends outward through the support plate 11 and is connected at 26 with a connecting rod 27 attached at 28 to a cam 29, which is driven by electric motor 13 under control of the timing mechanism. Cam 29 has peripherally spaced lugs 29b adapted to contact and open a limit switch 29a for the drive motor 13. Piston 22 has a passage 22a extending through the central portion thereof from one end to the other so as to allow passage of fluid from the inlet 14 and through the piston.

The outwardly extending end of the piston rod 25 is slidably supported by a bearing 31 in end plug 21. A plurality of circular spacing rings 30 are positioned in bore 14a between resilient circular sealing rings 30a.

Figure 11:
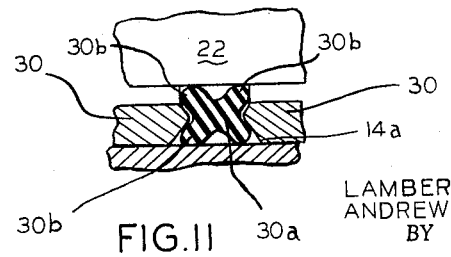
FIGURE 11 is a sectional view showing supporting and sealing rings within the valve.

The rings 30a, as is seen best in FIGURE 11, have a plurality of spaced ribs 30b extending completely around the circumference of the rings. These ribs are such as to provide spaced pairs of what appear as lobes in cross section (FIGURE 11) with one outward pair disposed against the wall of the bore 14a of the valve body while an inner pair extend inwardly of the inner surfaces of the spacer rings 30 so that the piston 22 is slidably supported on the inner pair and spaced from the rings 30. These lobes may be equally spaced from one another about a central axis extending circularly of the rings.

As is seen in the drawings, rings 30a are formed from a rubber or elastomeric material so that they are elastic or flexible and can be deformed. The spacer spacing rings 30 have end surfaces shaped to engage the indented side surfaces between the inner and outer pairs of lobes 30b, thus holding the rings on the vlave bore. These end surfaces also engage portions of the sides of the inner lobes of the rings while allowing these lobes to project radially inwardly and leave clearance spaces between the lobes of adjacent rings.

Also, as is seen in the drawings and particularly FIGURE 11, the spacer rings are so dimensioned that the clearance space between the rings 30 and the opposed, relatively movable surface of piston 22 is several times greater than any clearance space between the rings 30 and the valve bore 14a which space at this point may exist due to the tolerance of the mounting fit of the rings 30 and valve bore. These clearance spaces are sufficiently large that grains of sand may pass through them without jamming the valve.

The spacer rings 30, due to compression exerted from end plug 21, exert a compressing action on the resilient rings 30a which tends to squeeze the lobes of each inner and outer pair toward one another, and which tends to force the lobes of the inner pair radially inwardly and the lobes of the outer pair radially outwardly, thus forming a tight and effective seal with the wall of the bore of the valve and the surface of the piston 22. The rings 30a thus divide the bore of the valve into a plurality of axially spaced operating spaces under control of piston 22.

The rings 30 are provided with apertures spaced peripherally thereof to allow communication between these operating spaces and axially spaced grooves 32 which are formed in the valve body around the bore 14a. These grooves are aligned with the apertured portions of the rings 30 and lead to the inlet and outlet passages for the valve.

Piston 22 is recessed intermediate its ends as at 33 so as to provide spaced lands for a sliding engagement with the rings 30a, while the recessed portion has a length such as to span two adjacent ones of the grooves 32 in the several operative positions of the piston thereby allowing communication between the inlet and outlet ports from adjacent grooves 32.

One of the grooves 32 at the end of the bore has an opening 34 leading to the outlet 15. Another groove 32 adjacent this end groove has an opening 35 leading to a chamber 36 which leads to the tube 16. Another groove 32 at the other or inlet end of the bore has an opening 37 leading through a passage having a filter 38. This passage is formed as a bore in a boss 39 forming an integral part of the body. Boss 39 is sealed by a cap 40 contacting a gasket 41. Another groove 32 adjacent the groove at the inlet end has one opening 42 leading to a suction producing nozzle in the form of a first insert 43 supported in an aspirating passage in boss 39 and aligned and spaced from a venturi nozzle 44 also within the boss 39. The boss 39 and cap 40 are formed to provide a passage 45 leading from the filter 38. An opening 46 is found in the valve body on the opposite side of nozzle 44 and leads to the passage 17. The groove between the groove 32 in alignment with passage 46 and the groove 32 aligned with opening 35 has an opening 46a leading through a boss 46b to a drain port.

Figure 1:
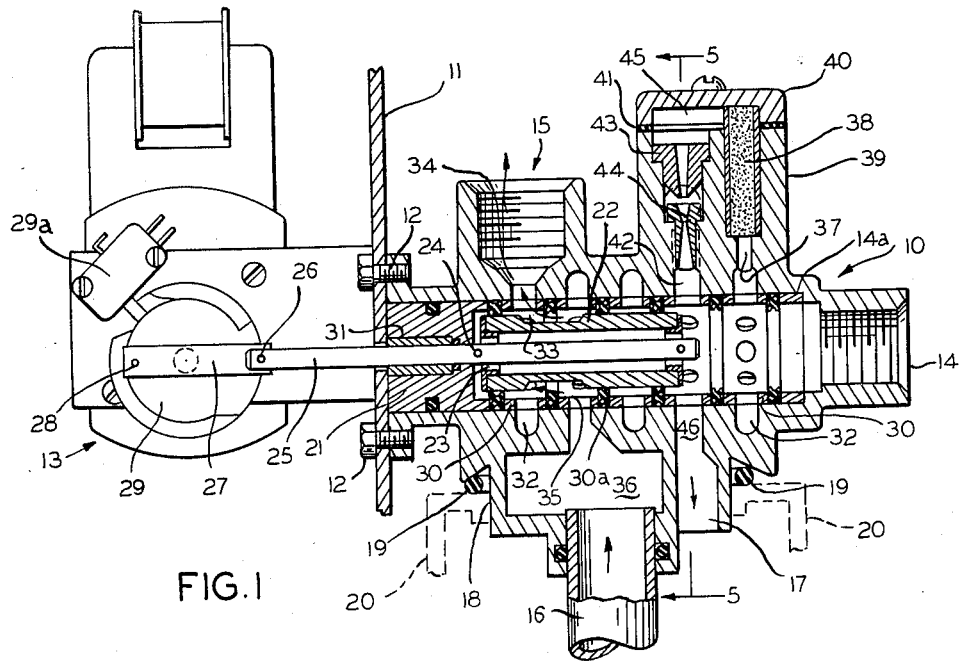
FIGURE 1 is a cross-sectional view of the assembled valve in a service position, and showing a schematic view of the actuating means.
Figure 5:
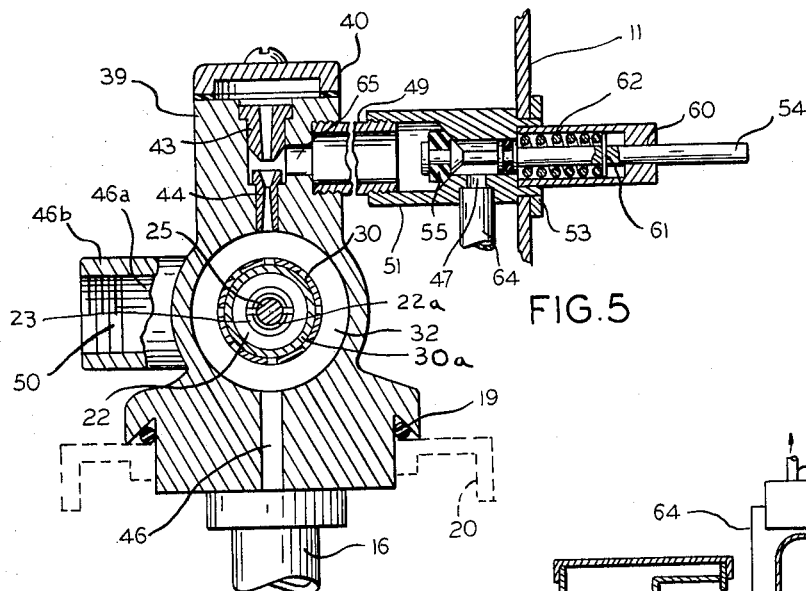
FIGURE 5 is a lateral cross-sectional view of the valve in service position and taken at the line 5—5 of FIGURE 1, but with the brine valve rotated through 90° for clarity of presentation.
Figure 7:
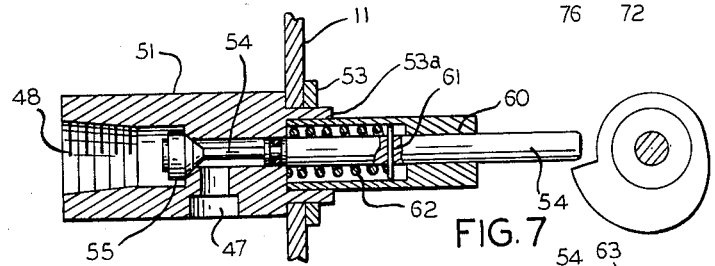
FIGURE 7 is a longitudinal cross-sectional view of the brine valve in a closed position, as shown in FIGURES 1 and 2.
Figure 8:
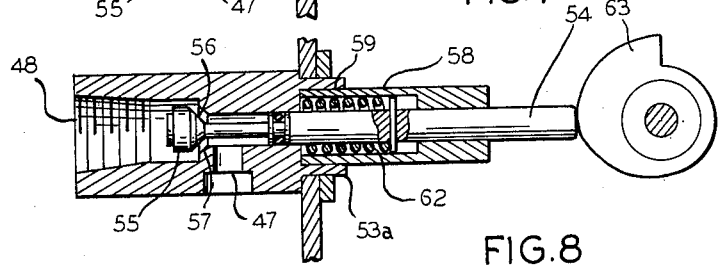
FIGURE 8 is a similar cross-sectional view of the brine valve in an open position, as when in the brine filling position or the brine and rinse position, as shown in FIGURES 3 and 4.

FIGURE 5 is a cross section of the unit taken at the line 5—5 in FIGURE 1 and illustrates a brine control mechanism which communicates with the space between nozzles 43 and 44. FIGURES 7 and 8 illustrate an operating mechanism for the valve in which an inlet 47 and an outlet 48, which is connected to valve body 10 by a conduit 49 to the assembled unit at 48, are formed in a second valve body 51. Valve body 51 may be mounted on wall 11 of housing 11a by means of a boss 53a and a nut 53.

The body 51 has a bore aligned with outlet 48 in which a rod 54 is slidably mounted. One end of rod 54 has a valve closure head 55 constructed of rubber or other pliable material attached thereto. The head 55 is tapered at 56 to provide sealing contact with a tapered valve seat 57 in the bore between inlet 47 and outlet 48. The other end of rod 54 extends outward from the body 51 and is partially encased within a tubular member 58 attached to the body 51 at 59 and acting as a slidable bearing therefor at 60. The rod 54 has a pin 61 extending therethrough for abutting engagement with a compression spring 62 for urging contact of the sealing head 55 with the seat 57. Valve 55 is moved away from its seat as shown in FIGURE 8 by a cam 63 engaging rod 54 and driven by motor 13 in timed relation to crank 27.

A conduit 64 is connected between inlet 47 and the brine tank. Outlet 48 is connected by conduit 49 to a passage 65 in boss 39, which passage leads to the space between nozzles 43 and 44.

Figure 6:
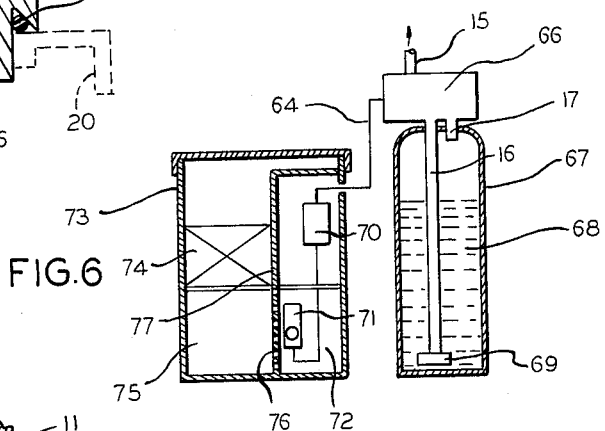
FIGURE 6 is a schematic view of the tank and valve assembly, as a conventional water softening unit.

A schematic layout showing a typical softener system is shown in FIGURE 6, wherein the control valve assembly is generally designated at 66 and mounted on a softening tank 67, which tank has the mineral 68 disposed therein and the soft water tube 16 passing down therethrough. Tube 16 has a distributor 69 at its lower end. The brine valve of the control valve assembly 66 is connected through conduit 64 and a flow control 70 to an inlet in a compartment 72 of a brine tank 73. The inlet 71 may be formed through a ball type air check in the lower portion of compartment 72 so that the inlet is closed when the brine level falls below the level of the inlet. Flow control 70 may take any one of several known forms, in which flow from the brine tank to the softener tank is at relatively rapid and unrestricted rate during the brining step of the cycle, while reverse flow, as when makeup water is supplied to the brine tank, is at a restricted rate. The restriction during reverse flow minimizes disturbances of the salt bed 74 as the level of makeup water rises within tank 73 to create a fresh supply of brine.

The lower portion 75 of the tank beneath salt bed 74 communicates with compartment 72 through a series of apertures 76 in a compartment wall 77 defining compartment 72.

The use and operation of the system are as follows. Motor 13 is normally held in an inoperative or de-energized position, at which time the valve piston is in the position illustrated in FIGURE 1 which corresponds to the normal service position. When in this position, hard water flows in to the valve body through the hard water line fitting 14, through the valve bore, and through passageway 46 which empties into the softener tank 67. This hard water passes downwardly through the bed of softening material within the tank 67, and soft water is then removed from the tank 67 from the outlet 16 so that soft water passes through the groove 32 aligned with passage 35 and through the recessed portion 33 of the piston and into the normal service line connection 15 whenever a tap is opened in the service line.

In this position of the valve, brine valve 55 is positively closed so that no brine solution can enter either the softener tank or the passages communicating with the hard water inlet or the soft water outlet. Also, in this position of the valve, the pressure conditions within the valve body are such that the hard water flowing in through the inlet 14 opposes any flow of hard water through passages 37 and 42 and through the aspirator 44. Thus, with no water flowing through the aspirator, brine will not be drawn into the system from the brine tank, even if the brine valve 55 is open.

Figure 2:
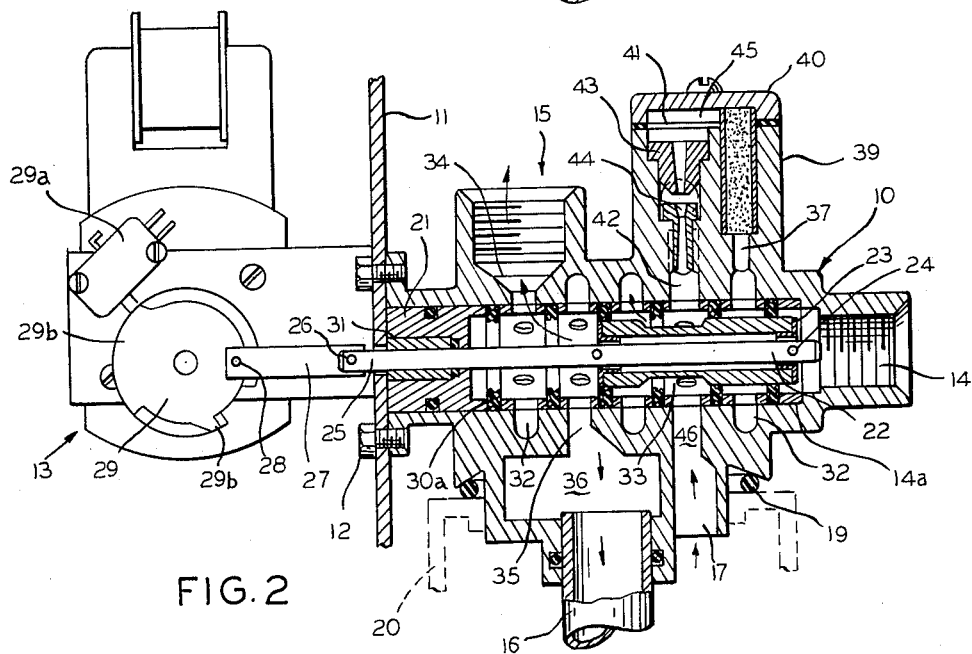
FIGURE 2 is a similar view showing the valve in a back wash position.
Figure 3:
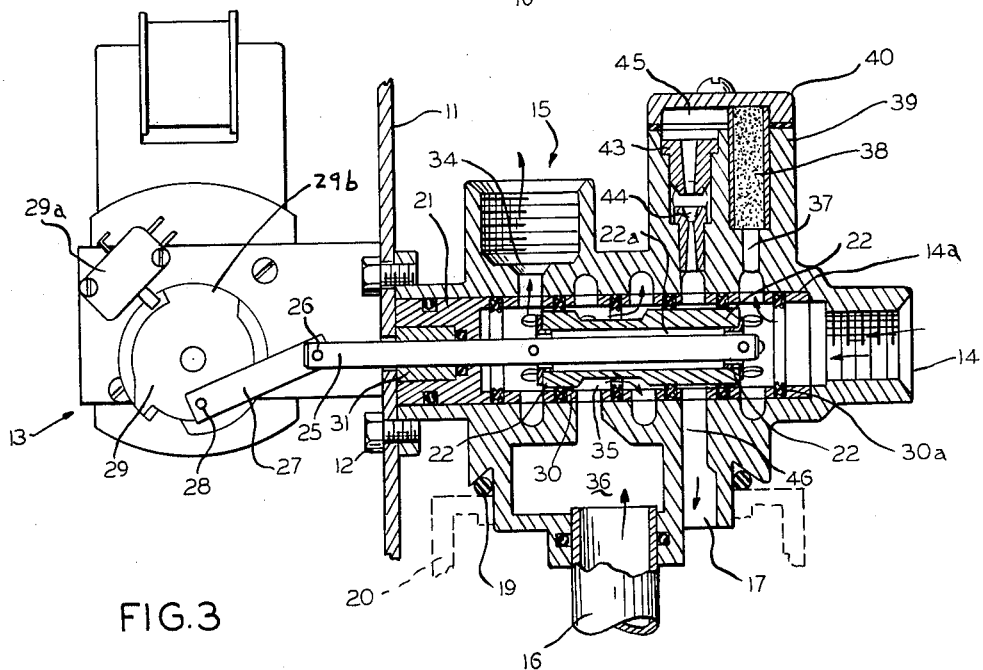
FIGURE 3 is still another view of the valve in a brine and rinse position.

At periodic intervals, which may be governed by clock work or some appropriate timing motor, motor 13 is energized. Motor 13 then rotates cam 29 from the position shown in FIGURE 1 (clockwise) to the position illustrated in FIGURE 2. During this rotation, the cam, which acts as a crank, moves connecting rod 27 and the valve piston all the way to the right as appears in FIGURE 2 which corresponds to the back wash position of the valve. This rotation of cam 29 continues until one of the lugs 29b on cam 29 contacts limit switch 29a which terminates operation of motor 13 and leaves the valve piston in the position shown in FIGURE 2. At this time, hard water flows in through the hard water inlet 14 and passes through the bypass 22a in the center of piston 22 to the service outlet 15. In this position of the valve, the lands of the valve piston block flow of hard water in the normal direction. Some of the hard water flows through the piston and empties through the annular ports of the valve body into the pipe 16. Water then passes through the softening tank 67 and upwardly through fitting 17 and around the valve piston recess 33 between the lands of the piston and to the drain ports formed by the middle groove in the piston body for discharge through the drain conduit or fitting 46b. It should be noted that in this back washing position, brine valve 55 remains closed with the result that no flow occurs through aspirator 44. After a predetermined period of the back washing operation, which is again governed by the clock motor, the circuit to motor 13 is again energized which rotates cam 27 clockwise to the position illustrated in FIGURE 3. At the same time, cam 63, which is rotated with cam 29 (but counterclockwise in FIGURES 7 and 8) moves to a position wherein the high part of the cam moves rod 54 to open brine valve 55. When the cam 29 has moved the valve piston 22 back to the intermediate position shown in FIGURE 3, a high point on cam 29 again contacts limit switch 29a to terminate energization of motor 13 so as to hold the piston in this intermediate position. In this intermediate position, hard water flows in through inlet 14 and through the bypass conduit 22a within the piston for discharge through the normal service outlets of the system. Hard water also flows through filter 38 and through the aspirator nozzles 43 and 44, thus creating a suction condition in the passage 65 leading through the brine valve to the brine tank. This pulls the brine solution upwardly through the brine valve and downwardly for discharge through the passage 17 and into the softener tank 67 so as to regenerate the material within the softener tank. This flow of brine to the softener tank continues for a predetermined period of time, while overflow from the softener tank is discharged through the normal intake line 16 from the softener tank and to the drain port 46a through the annular groove 33 between the spaced lands of the piston. When a predetermined quantity of brine has been withdrawn from tank 75 and when the level within compartment 72 is reduced to the level of air check 71, air check 71 closes, thus closing line 64. Hard water continues to flow through the nozzles 43 and 44 and through outlet 17 to the softener tank so as to rinse the same, with the rinse water being passed through outlet pipe 16 to the drain. After the passage of a predetermined period of time corresponding to the regeneration and rinsing period desired, which again is governed by the timing motor, motor 13 is again energized which causes the cam 29 to continue its clockwise rotation to the position illustrated in FIGURE 4 where a high point or lug 29b on cam 29 again contacts the actuating member of limit switch 29a and terminates energization of motor 13. This is the position in FIGURE 4 which is the position which allows both normal service operation and filling of the brine tank with makeup water. As the valve piston is shifted from the position of FIGURE 3 to the position of FIGURE 4, brine valve 55 remains open for a preselected period of time, as governed by the length of the high point on cam 63. When the control valve is in the position of FIGURE 4 and with the brine valve 56 open, hard water flows into the softener tank through the normal inlet 17, while hard water may pass through the aspirating passage for discharge through fitting 64 leading to the brine tank. After a predetermined period of time, which corresponds to a selected amount of water which is supplied to the brine tank, cam 63 closes brine valve 56 which positively shuts off flow to and from the brine tank.

Flow regulator 70 may take any one of several forms. Its purpose is to allow full and unrestricted flow from the brine tank when the system calls for brine solution, while restricting reverse flow for a relative slow feed of makeup water to the brine tank.

The control valve structure itself is simply and economically formed by casting the main valve body and then boring a hole for the reception of the operation piston, it being understood that some of the outlets and inlets from the main body may be formed during the casting process while others may be drilled into the valve body. After the main bore of the valve body is formed the spacer rings 30 are inserted into place within the bore with a sealing ring 30a positioned between metallic rings as illustrated in the drawings. The end plug of the valve bore is then fitted in place and fixed so as to place a slight compression on the sealing rings, all of which holds the entire assembly in position. The sealing rings are pinched between the spacer rings to lock them in position. With the operating piston in place, the lands of the piston tend to compress the lobes of the quadrant rings somewhat so that a good seal is established between the lands of the piston and the rings and wall of the bore. The rings 30a thus seal off several operating passages within the valve body and with the position of the piston therein. Extremely close working clearances between the piston and valve bore are, therefore, unnecessary because of the slight compressibility of the quadrant rings. Furthermore, extremely close tolerances between the metallic rings and the wall of the bore in the valve body are unnecessary because the quadrant rings adequately provide for a seal to the wall of the valve body.

The particular formation of the quadrant rings is particularly advantageous in terms of maintaining sealing contact. When disposed in the manner illustrated in the drawings wherein a pair of lobes engage the piston while a pair of lobes engage the wall of the valve body bore, pressure forces exerted axially of the valve bore tend to tighten the seal between the piston and the valve bore. In this regard, it may be noted that pressure forces exerted by the spacing rings tend to flatten out the lobes and press them tightly against the wall of the bore in the valve body. Fluid pressure forces working in the several operating spaces within the valve body tend to force the lobes from their normal position which is inclined to the axis of the piston more nearly toward a position which is inclined to the axis of the piston more nearly toward a position which is perpendicular to such axis and when so forced the diameter of the opening through the rings tends to be reduced, all of which tightens the sealing contact with the valve piston.

The use of the quadrant rings also provides clearance between the piston and the spacer rings which define the inner diameter of the valve bore. This enables use of the valve in controlling flow of liquids having small particles such as sand or grit entrained therein, since such particles may pass through the clearance space and to and from the inlet and outlet spaces of the valve.

FIGURE 12 illustrates a control valve of the same type illustrated in the other figures, while illustrating a modification which enables a rapid rinse for a softener system following the slow rinse step described in connection with FIGURES 1 through 11, inclusive. In FIGURE 12, for example, the control valve body 100 and actuating means are identical to the control valve body in the preceding figures, except for a modified piston and an additional position of the piston under control of the timing means. The valve body includes an inlet 101 for connection to a hard water supply line and the service outlet 102. Valve body 100 has a piston 103 of modified form so as to enable positioning of the piston as shown in FIGURE 12 while allowing direct flow of hard water from the inlet 101 through the conduit 104 which is connected to the softener tank for a rapid rinsing of the softener tank. Piston 103 is identical to piston 102 in the preceding figures except for the portion of the piston at the inlet side thereof. This end portion is cut away providing a reduced diameter at 105 thereby allowing passage of hard water directly from inlet 101 past the confronting end of piston 103 and to the passage 104 leading to the softener. In this position of the valve piston, hard water may still bypass through the passage 106 formed through the piston and thence through the normal service outlet 102. The water flowing through the softener tank during the rapid rinse flushes salt pockets of the softener and cleans out pockets of backwash water in the softener. This rinse water then passes to the drain.

The timing mechanism for the motor 107 may be arranged so as to stop piston in the position illustrated in FIGURE 12, and with the switch cam 108 for the drive mechanism arranged to contact limit switch 109 at the position illustrated and hold the piston in this position for a pre-selected period of time. The timing means is arranged to move the piston to this position after the piston is held in the regenerative or brining and slow rinse position of FIGURE 3 for a pre-selected interval of time. The hard water may flow to the brine tank so as to supply makeup water therefor in this rapid rinse position. After passage of a time interval sufficient to rinse the softener tank and refill the brine tank, the timing means moves the piston to the service position of FIGURE 1.

Figure 4:
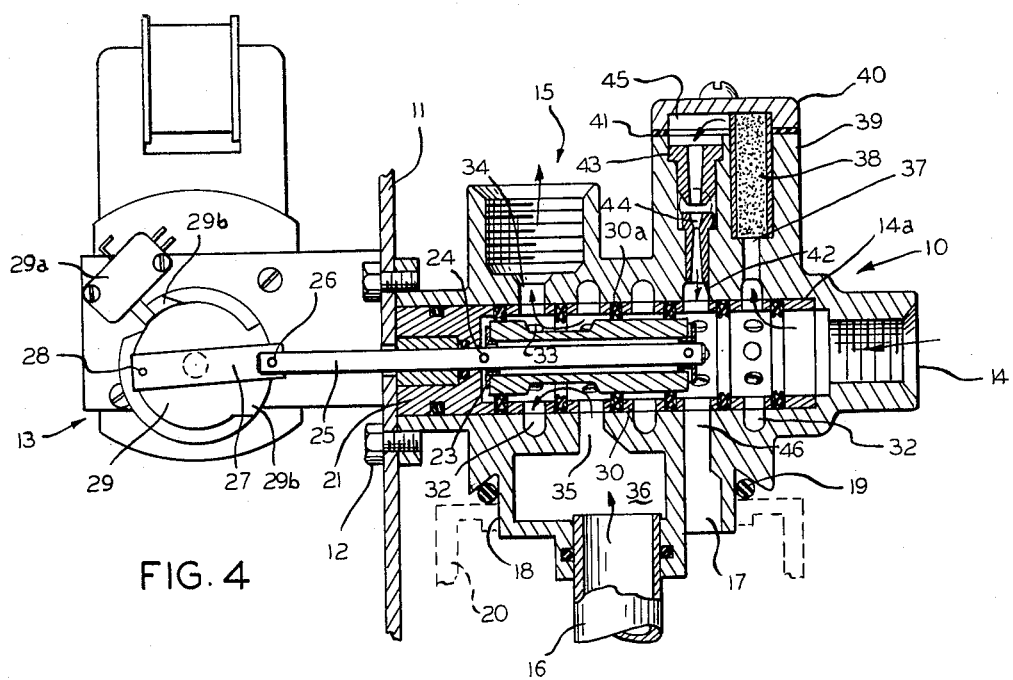
FIGURE 4 is another similar view of the valve showing the valve in a brine tank filling position.

The modified form of valve piston position of FIGURE 12 may be used in substitution for that of FIGURE 4.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. A piston type valve including a valve body having an inlet port and outlet ports leading to a bore in said valve and spaced along said bore, a piston mounted for reciprocating movement in said bore and having a surface opposed to and radially spaced from the surface of said bore, means defining axially spaced valve lands between said surfaces and carried by one of said surfaces in a sealing relation while being in slidable sealing relation with the other surface including a plurality of elastomeric and deformable sealing rings of quad ring type in axially spaced relation on said one surface, each ring having an annularly extending pair of lobes in a sliding, sealing engagement with said other surface, the lobes of each pair being in diverging relation to one another and diverging toward said other surface, and means defining annular abutment and compression members engageable with the side surfaces of each ring, said members being mounted on said one surface, said members having surfaces engaged with axially indented portions of the side surfaces of said rings and engaged with portions of the side surfaces of the lobes of each ring, said rings having an axial dimension adjacent said one surface greater than the axial dimension at said indented portions, said lobes projecting radially beyond said members to leave a clearance space between said members and said other surface, which space extends from the projecting portions of the lobes of one ring to the projecting portions of the lobes of an adjacent ring, said members being under compression to thereby deform said rings and exert forces on the lobes of each pair of axial directions toward one another, thereby forcing the lobes of each ring radially into a sealing engagement with said other surface, said rings having an additional pair of lobes engaged with said one surface; said clearance space having a radial dimension several times greater than the radial dimension of the mounting fit between any of said members and said one surface.

2. A valve as set forth in claim 1 wherein said additional lobes are formed identically to said first named lobes while being spaced radially therefrom so that each ring has inner and outer lobes for engaging the surfaces of said piston and bore.

3. A valve as set forth in claim 1 wherein at least one of said compression and abutment members is a collar slidably mounted on said one surface and having ends engaged with the sides of a pair of rings.

4. A valve as set forth in claim 1 wherein said rings and said compression and abutment members are mounted on said valve bore and said lobes have a sealing slidable fit with said piston.

5. A piston type control valve wherein the valve body has a main inlet port and a main outlet port axially spaced along the bore of the valve from said inlet port, and other ports positioned along said bore between said main ports for control of fluid to and from other apparatus, the improvement comprising a piston slidably mounted in an elongated bore in said valve body, said main outlet port being between the opposite ends of said bore, said piston having a passage formed through the opposite end faces thereof and from one end portion of the piston to the other to thereby allow flow therethrough in one position of said piston from said main inlet port to said main outlet port, said piston having an actuating piston rod extending through said passage, pins on said rod at opposite ends of said piston for holding said piston on said rod, axially spaced sealing means co-operable between said bore and said piston for creating axially spaced flow spaces along said bore, said piston being movable to another position spaced from said first named position and co-operable with said sealing means in said second named position for closing off flow through said passage to said main outlet port, fluid from said inlet port being passed through said passage and to the outlet end of said bore in both positions of said piston, said other ports being positioned so that said main inlet port communicates with one of said other ports in said first named position and communicates with still another port in said second named position, said one port being in communication with said main outlet port in said other position.

6. A valve as set forth in claim 5 wherein annular resilient seal rings are positioned along said bore between said ports, and spacer rings having flow apertures in communication with said ports are positioned on said valve bore between adjacent pairs of seal rings, each seal ring being under axial compression and having plural annular lobes projecting radially inwardly for a sealing engagement with said piston while leaving a clearance space between said piston and all portions of said spacer rings.

7. A valve as set forth in claim 5 wherein said piston has a recessed portion intermediate its ends to provide two spaced piston lands, one of said lands having an axial dimension such that it is in contact with at least two seal rings in all positions of said piston.

References Cited by the Examiner
UNITED STATES PATENTS

| | | | |
|---|---|---|---|
| 1,132,203 | 3/1915 | Matthews | 251—325 X |
| 1,343,105 | 6/1920 | Baker et al. | 251—325 |
| 1,925,109 | 9/1933 | Olson | 137—625.48 X |
| 2,132,030 | 10/1938 | Hunt et al. | 137—625.38 |
| 2,631,811 | 3/1953 | Malloy | 137—625.29 |
| 2,704,554 | 3/1955 | Russell et al. | 137—625.29 |
| 2,892,644 | 6/1959 | Collins | 251—324 X |
| 2,905,325 | 9/1959 | Johnson | 210—275 |
| 2,962,437 | 11/1960 | Lindsay | 137—625.29 X |
| 3,000,399 | 9/1961 | Brukner | 251—324 X |
| 3,049,239 | 8/1962 | Rudelich | 210—275 |
| 3,098,660 | 7/1963 | Hausner | 277—187 |

M. CARY NELSON, *Primary Examiner.*

A. ROSENTHAL, *Assistant Examiner.*